United States Patent Office 3,201,223
Patented Aug. 17, 1965

3,201,223
METHOD OF PREPARATION OF SILVER POWDER HAVING A PROTECTIVE GUM COATING
Bohuslav Cuhra and Karel Grüner, Prague, Czechoslovakia, assignors to Tesla, narodni podnik, Prague, Czechoslovakia
No Drawing. Filed Nov. 6, 1963, Ser. No. 321,682
Claims priority, application Czechoslovakia, Nov. 15, 1962, 6,448/62
7 Claims. (Cl. 75—.5)

The invention relates to the preparation of powdered silver of such a particle size that suspensions and pastes of the powder when applied to ceramic materials, glass, metal, quartz, mica, ferrites and other materials and when fired, yield a sintered coating of good electro-physical properties.

The powdered silver when mixed with a varnish consisting mainly of organic resins and diluents forms silver suspensions which may be fired to produce silver coatings firmly adhering to a ceramic substrate.

It is known to prepare powdered silver by spraying the molten metal, by thermic dissociation of silver oxide and of organic compounds of silver, or by electrolytic or chemical reduction of aqueous solutions of silver salts. The silver suspensions and pastes must be kept free from all impurities, in particular alkalies and chlorides. Silver powder of extreme purity is desirable in the production of capacitors made of low-loss materials.

The method according to the invention produces powdered silver of a particle size suitable for many applications. It does not rely on the chemical reduction of silver salts which are soluble in water. It is safe, economical, and its results are reproducible. The powdered silver produced according to this method is suitable for the preparation of aqueous suspensions and for applications in which silver of similar properties is required.

The silver powder produced by this method has an extremely low content of impurities, such as alkalies and foreign metals which may be present in quantities as low as $10^{-3}$ to $10^{-2}\%$.

In practicing the method of the invention, pure silver oxide is prepared by precipitation from an aqueous solution of silver nitrate by means of sodium hydroxide or potassium hydroxide, and the silver oxide is reduced in aqueous suspension by formaldehyde in the presence of a protective colloid, such as gum arabic, distilled water being used as a reaction medium.

The first step of the method consists in the precipitation of an aqueous solution of 400 to 600 g./l. silver nitrate with sodium hydroxide or potassium hydroxide. All reactants are dissolved in distilled water. The precipitated silver oxide is then washed free of soluble salts by decantation with hot distilled water until the concentration of soluble salts (potassium nitrate and sodium nitrate) is reduced at least to 0.4 g./l.

In the second step, the pure silver oxide, while suspended in water, is reduced by means of a 40% solution of formaldehyde in an amount of up to 25% based on the original silver nitrate. The reduction is performed in two stages: The first stage is carried out at a temperature of 20° to 40° C., whereby the formaldehyde is oxidized to formic acid and the reduction is carried out in an acid medium. The formic acid partly reacts with the silver oxide to silver formate.

In the second stage of the reduction, the temperature is raised from 40 to 70° C., whereby the silver formate dissociates to formic acid, metallic silver powder, carbon dioxide, and a small quantity of hydrogen. The dissociation of formic acid is catalyzed by the silver powder.

The production of the powdered silver according to the described method is carried out in a vessel provided with cooling equipment, with heating elements and with a stirrer.

The reaction mixture becomes hot while the formaldehyde solution is gradually added to the silver oxide suspended in water, and the reaction temperature must be limited by cooling to 40° C. at most. The reduction of the silver oxide is carried out with intensive mixing. The temperature should be controlled by an exact thermometer. After the reduction has been finished, the reaction mixture is gradually heated with steady mixing to a temperature of 70° C. The reaction mixture is kept at this temperature until the concentration of silver ions falls below 0.5 g./l. The mother liquor which contains silver in an insignificant quantity may be again applied to the preparation of silver oxide after having been separated from the silver powder. The formation of fine particles depends on the presence of a protective colloid, such as gum arabic, which is added in a small quantity not exceeding 1.5% by weight of the silver nitrate originally used.

The equipment employed for the reaction has to be made of material resistant to formic acid, the latter being present in a concentration of approximately 20 g./l. Contamination of the silver powder by corrosion products would unfavorably influence the electrophysical properties of a silver coating produced by firing a silver suspension prepared from the powder.

After sedimentation, the reduced silver is separated from the mother liquor by decanting. Before the mother liquor is fully separated from the silver, a mixture of ethylene glycol with benzylalcohol in a ratio of 3:1 is added to the sedimented, paste-like silver suspension. This mixture prevents the agglomeration of the silver particles during the subsequent drying. The sedimented silver is dried at a temperature of not more than 60° C. either in a stream of air, or in a spray dryer, or by any other conventional drying process.

The method described above may be modified by carrying out the reduction of the silver oxide with one half of the amount of formaldehyde theoretically required, that is, about 12 percent based on 40% formaldehyde solution and the original amount of silver nitrate. The reaction mechanism is such that the oxidation of formaldehyde by silver oxide produces formic acid. The latter gradually converts the silver oxide to silver formate which dissociates at a temperature of 70° to 80° C. to formic acid and silver powder. Simultaneously, carbon dioxide and an insignificant quantity of hydrogen are released. The formic acid liberated dissolves further portions of silver oxide, and the reaction cycle is repeated. The decomposition of silver oxide proceeds at an exponentially increasing rate to the complete reduction to powdered silver. It is an advantage of this method that the reaction is performed in a medium of very low acidity, and of correspondingly low corrosiveness. The mixture on the completion of the reaction has a pH value of 6 to 6.5. In the reaction described above, the soluble components originally present in the reaction mixture are dissociated to gases, and only pure silver in aqueous suspension remains. The reaction is also carried out in the presence of a protective colloid.

Silver powder having more modest electrophysical properties, but still suitable for coating ceramic structural elements may be prepared as follows:

400 to 600 g./l. silver nitrate is dissolved in tap water and reduced with formaldehyde in the presence of a protective colloid and sodium hydroxide or potassium hydroxide at a temperature of 50° to 70° C. As this reaction produces much foam, an anti-foam agent, such as amyl alcohol or benzyl alcohol should be added. When the reaction is completed, the aqueous medium reaches a pH value of 6 to 6.5.

The silver powder is separated from the mother liquor containing sodium nitrate or potassium nitrate by decantation and washing with tap water until the reaction of the rinsing water for nitrate ions with diphenylamine is negative. The further work-up of the product is as described above.

What we claim is:

1. A method of preparing small silver particles which are suitable for use to coat the surface of materials, which method comprises dissolving in one liter of distilled water between 400 and 600 grams of silver nitrate and a sufficient amount of alkali hydroxide to react with the silver nitrate to form a precipitate of silver oxide, adding sufficient formaldehyde to reduce the silver oxide to metallic silver in two phases, and a water soluble particle protective gum, first heating the mixture to and maintaining the same at 20° to 40° C. to form silver formate, and then heating the mixture to and maintaining the same at 40° to 70° C. to dissociate the formate radical to produce gum protected metallic silver particles, and recovering the particles.

2. A method according to claim 1, wherein the mixture on completion of reaction has a pH value of 6 to 6.5.

3. A method according to claim 1, wherein the concentration of alkali nitrate after precipitation of the silver oxide is reduced to at least 0.4 gram per liter.

4. A method according to claim 1, wherein 40% concentrated formaldehyde is used in an amount of 12% to 25% based on the amount of silver nitrate.

5. A method according to claim 1, wherein the protective gum is gum arabic.

6. A method according to claim 5, wherein about 1.5% gum arabic is used based on the amount of silver nitrate.

7. A method according to claim 1, wherein a mixture of three parts ethylene glycol and one part benzyl alcohol is added to the recovered silver particles, and the silver particles are air dried at a temperature not exceeding 60° C.

References Cited by the Examiner

UNITED STATES PATENTS

| | | | |
|---|---|---|---|
| 2,478,652 | 8/49 | Byler et al. | 75—118 |
| 2,493,396 | 1/50 | Farber et al. | 75—118 |
| 2,752,237 | 6/56 | Short | 75—118 |

OTHER REFERENCES

Addicks: Silver In Industry, Reinhold Publishing Corp., New York, 1940, pp. 285–290.

DAVID L. RECK, *Primary Examiner.*

HYLAND BIZOT, *Examiner.*